United States Patent
Kishi et al.

(10) Patent No.: US 11,748,711 B2
(45) Date of Patent: Sep. 5, 2023

(54) MANAGEMENT DEVICE, MANAGEMENT METHOD, AND MANAGEMENT PROGRAM

(71) Applicant: Nippon Telegraph and Telephone Corporation, Tokyo (JP)

(72) Inventors: Koji Kishi, Tokyo (JP); Tsuneko Kura, Tokyo (JP); Junko Hashimoto, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 380 days.

(21) Appl. No.: 17/051,375

(22) PCT Filed: May 13, 2019

(86) PCT No.: PCT/JP2019/018934
§ 371 (c)(1),
(2) Date: Oct. 28, 2020

(87) PCT Pub. No.: WO2019/221059
PCT Pub. Date: Nov. 21, 2019

(65) Prior Publication Data
US 2021/0049556 A1 Feb. 18, 2021

(30) Foreign Application Priority Data

May 15, 2018 (JP) .................................. 2018-093530

(51) Int. Cl.
*G06Q 10/107* (2023.01)
*G06Q 50/26* (2012.01)
(Continued)

(52) U.S. Cl.
CPC .......... *G06Q 10/107* (2013.01); *G06F 16/22* (2019.01); *G06Q 10/103* (2013.01);
(Continued)

(58) Field of Classification Search
CPC ....... G06F 10/107; G06F 16/22; H04L 51/42; H04L 51/21; H04L 2101/37; G06Q 10/103; G06Q 50/265; G06Q 50/01
See application file for complete search history.

(56) References Cited

U.S. PATENT DOCUMENTS 7,668,909 B2 * 2/2010 Nambu .................. G06Q 10/10
709/204
7,802,263 B2 * 9/2010 Fuchs ..................... H04L 67/12
709/213

(Continued)

FOREIGN PATENT DOCUMENTS

JP 2014-78092 5/2014
JP 2018-73164 5/2018

OTHER PUBLICATIONS

Tomohiro et al., "Initiatives for Integrated Risk Management," NTT Technical Journal, 2015, 27(10):27-30, 9 pages (with English Translation).

*Primary Examiner* — Sargon N Nano
(74) *Attorney, Agent, or Firm* — Fish & Richardson P.C.

(57) ABSTRACT

An support system server (100) accepts, for each board related to crisis response activity, browsing of one or more messages registered in the board and registration of a message in the board. When a transmission source of a received e-mail is an e-mail address of a user of the board, the support system server (100) registers a message included in the e-mail in the board. When a new message is registered in the board, the support system server (100) distributes an e-mail including the message to the e-mail address of the user of the board.

9 Claims, 6 Drawing Sheets

(51) Int. Cl.
  *H04L 51/21* (2022.01)
  *G06Q 50/00* (2012.01)
  *G06F 16/22* (2019.01)
  *G06Q 10/10* (2023.01)
  *H04L 51/42* (2022.01)
  *H04L 101/37* (2022.01)

(52) U.S. Cl.
  CPC .......... *G06Q 50/265* (2013.01); *H04L 51/21* (2022.05); *H04L 51/42* (2022.05); *G06Q 50/01* (2013.01); *H04L 2101/37* (2022.05)

(56) References Cited

U.S. PATENT DOCUMENTS

| | | | | |
|---|---|---|---|---|
| 9,356,896 | B2* | 5/2016 | Jesse | H04L 12/1859 |
| 10,452,337 | B1* | 10/2019 | Clements | G06Q 10/10 |
| 2003/0093788 | A1* | 5/2003 | Takenaka | H04N 7/081 |
| | | | | 725/32 |
| 2003/0197615 | A1* | 10/2003 | Roche | G08B 25/14 |
| | | | | 340/531 |
| 2005/0086686 | A1* | 4/2005 | Thomas | G09F 27/00 |
| | | | | 725/112 |
| 2007/0022169 | A1* | 1/2007 | Suzuki | H04M 3/493 |
| | | | | 709/206 |
| 2008/0309485 | A1* | 12/2008 | Raduchel | G08B 21/24 |
| | | | | 340/540 |
| 2009/0048927 | A1* | 2/2009 | Gross | G06Q 30/00 |
| | | | | 705/14.42 |
| 2010/0146343 | A1* | 6/2010 | Shimada | G06Q 10/107 |
| | | | | 714/48 |
| 2013/0159082 | A1* | 6/2013 | Abbott | G06Q 10/107 |
| | | | | 705/14.1 |
| 2014/0095419 | A1* | 4/2014 | Gandhi | H04L 67/10 |
| | | | | 706/46 |
| 2014/0108567 | A1* | 4/2014 | Borger | H04L 51/52 |
| | | | | 709/206 |
| 2014/0164536 | A1* | 6/2014 | Jesse | H04L 12/1859 |
| | | | | 709/206 |
| 2014/0236885 | A1* | 8/2014 | Muller | G06Q 10/10 |
| | | | | 707/608 |
| 2015/0149153 | A1* | 5/2015 | Werth | G06F 40/30 |
| | | | | 704/9 |
| 2015/0261940 | A1* | 9/2015 | Roundy | G06F 21/10 |
| | | | | 726/26 |
| 2017/0054668 | A1* | 2/2017 | Lee | H04L 51/42 |
| 2017/0249711 | A1* | 8/2017 | Odegard | G06Q 50/16 |
| 2018/0024969 | A1* | 1/2018 | Khoo | H04L 51/063 |
| | | | | 709/206 |
| 2018/0324136 | A1* | 11/2018 | Bastide | H04L 51/212 |
| 2020/0326848 | A1* | 10/2020 | Amini | G06F 3/0416 |

* cited by examiner

MANAGEMENT DEVICE, MANAGEMENT METHOD, AND MANAGEMENT PROGRAM

CROSS-REFERENCE TO RELATED APPLICATIONS

This application is a National Stage application under 35 U.S.C. § 371 of International Application No. PCT/JP2019/018934, having an International Filing Date of May 13, 2019, which claims priority to Japanese Application Serial No. 2018-093530, filed on May 15, 2018. The disclosure of the prior application is considered part of the disclosure of this application, and is incorporated in its entirety into this application.

TECHNICAL FIELD

The present invention relates to a management device, a management method, and a management program for a message to a board in a support system.

BACKGROUND ART

Conventionally, an integrated risk management support system (hereinafter abbreviated as "support system") has been known as a technology for supporting crisis response activity in case of natural disaster and cyberattacks. The support system is designed such that a user of the support system can progress efficient crisis management by using three screens of Plan, Do, and See. In particular, boards for communication about crisis response activity are placed on the Do screen, and users of the support system can open a screen of a corresponding board, and write information necessary for crisis response activity and receive instructions from the screen with a PC or a smartphone.

CITATION LIST

Non Patent Literature

[NPL 1] Measures to Achieve a Joint Risk Management Support System, [searched on Apr. 25, 2018], Internet <URL:http://www.ntt.co.jp/journal/1510/files/n201510027.pdf>

SUMMARY OF THE INVENTION

Technical Problem

However, there is a problem in that the support system cannot be used when a terminal used by a user of the support system cannot use a browser capable of writing information in the support system and browsing the information (for example, can use only e-mail).

The present invention has been made in order to solve the above-mentioned problem, and it is an object thereof to enable the use of a support system even when a terminal used by a user of the support system cannot use a browser capable of writing information in the support system and browsing the information (for example, can use only e-mail).

Means for Solving the Problem

In order to solve the above-mentioned problem, the present invention provides a management-device for accepting, for each board related to crisis response activity, browsing of one or more messages registered in the board and registration of message in the board, including: a storage unit for storm for each board, one or more messages registered in the board and e-mail address information on a user of the board; an e-mail reception unit for receiving an e-mail including a message to the board; a message registration unit for registering, when a transmission source of the received e-mail is an e-mail address indicated by e-mail address information on a user of the board, a message included in the e-mail in the board; and an e-mail distribution unit for distributing, when the message has been registered in the board, an e-mail including the registered message to an e-mail address of the user of the board.

Effects of the Invention

According to the present invention, a support system can be used even when a terminal used by a user of the support system cannot use a browser capable of writing information in the support system and browsing the information (for example, can use only e-mail).

DESCRIPTION OF EMBODIMENTS

An embodiment of the present invention is described in detail below with reference to the drawings. Note that a support system server described below is provided with standard functions mounted in the support system disclosed in Non Patent Literature 1. The present invention is not limited to the embodiment described below.

Outline

Figure 1:
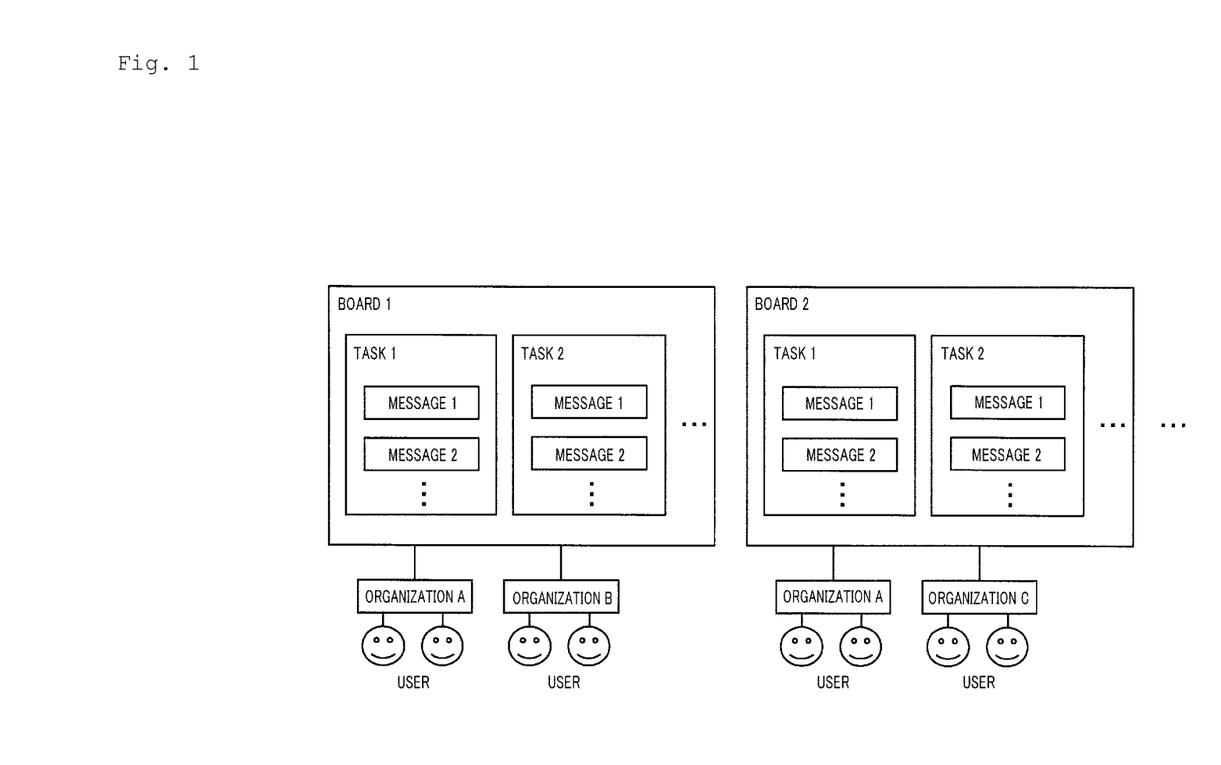
FIG. 1 is a diagram for describing the outline of a support system server.

First, the outline of a support system server (management device) in this embodiment is described with reference to FIG. 1. The support system server displays, for example, three screens for Plan, Do, and See (Understanding the current situation) related to crisis response activity. Of these, the Do screen includes one or more boards (for example, boards 1 and 2 illustrated in FIG. 1) indicating messages related to crisis response activity. The support system server registers a message transmitted from a terminal (not shown) of a user of a board in the board, and sets the message registered in the board such that the message can be browsed from the terminal of the user of the board.

A board n the support system server holds, for each task related to crisis response activity, one or more messages related to the task in a classified manner. In other words, a board includes one or more tasks (set of one or more messages). For example, a board 1 includes tasks 1, 2, . . . , and each task includes messages 1, 2, . . . .

Each board is associated with one or more organizations. For example, the board 1 is associated with members (users) of organizations A and B, and a board 2 is associated with members (users) of organizations A and C. Members of an organization associated with each board write messages in boards registered by themselves and browse messages in boards to perform communications about crisis response activity.

When receiving a message to a board, the support system server receives a message also by an e-mail from a terminal of a user of the board. When a message is registered in a board, the support system server distributes contents of the message to a member of an organization associated with the board by an e-mail. In this manner, the present invention enables a user to register a message in a board and browse the message even when a terminal used by the user is a terminal that can use only an e-mail.

Note that, in the following description, an e-mail may be, for example, an electronic e-mail or a social networking service (SNS) message such as LINE (registered trademark).

Configuration

Figure 2:
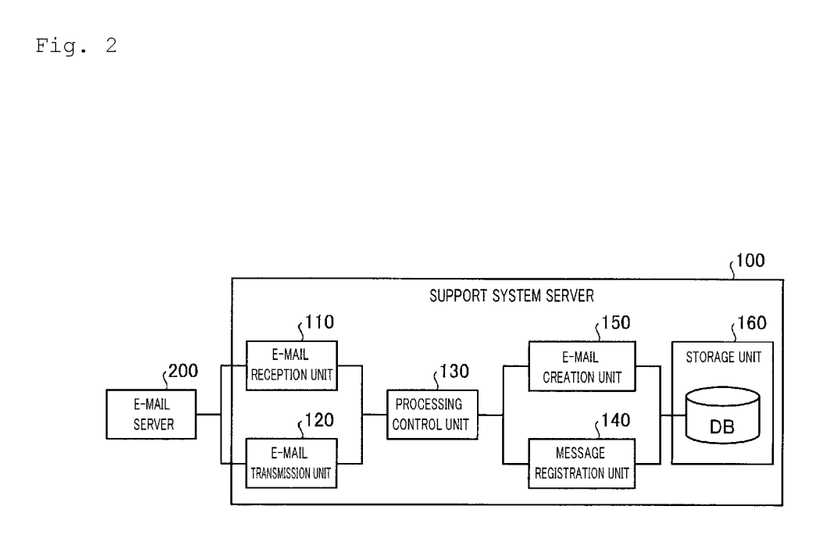
FIG. 2 is a block diagram illustrating an example of a configuration of the support system server.

Next, the configuration of the support system server is described in detail with reference to FIG. 2. Note that, in FIG. 2, a support system server 100 and an e-mail server 200 are connected by a network such as the Internet. The support system server 100 is allocated with an e-mail address.

The support system server 100 includes an e-mail reception unit 110, an e-mail transmission unit (e-mail distribution unit) 120, a processing control unit 130, a message registration unit 140, an e-mail creation unit 150, and a storage unit 160.

The e-mail reception unit 110 receives an e-mail addressed to the support system server 100 from the e-mail server 200. For example, the e-mail reception unit 110 receives an e-mail including a message to a board from a terminal of a user of the support system server 100.

The e-mail transmission unit 120 distributes the e-mail output from the processing control unit 130 to the user of the board. For example, the e-mail transmission unit 120 distributes the e-mail output from the processing control unit 130 to the user of the board by the e-mail server 200. The processing control unit 130 controls each unit in the support system server 100.

The message registration unit 140 registers the message to the board from the user of the board in a database (DB) in the storage unit 160.

For example, the message registration unit 140 registers a message included in the e-mail output from the e-mail reception unit 110 in the board. For example, when a transmission source address of the e-mail is an e-mail address of the user of the board and when a board ID and a task ID are included in the e-mail, the message registration unit 140 registers the message included in the e-mail in a board and a task in the DB that correspond to the board ID and the task ID. On the other hand, when the transmission source address of the e-mail is not an e-mail address of the user of the board, the message registration unit 140 does not register the message included in the e-mail.

Note that the message registration unit 140 may register a message transmitted through a browser on a terminal of the user of the board in the board.

When receiving a message to the board from a terminal of the user of the board, the message registration unit 140 receives information (e-mail distribution information) on whether to distribute the message to a member (user) in an organization associated with the board by an e-mail. The message registration unit 140 registers the received e-mail distribution information in the DB together with the message.

When the message is registered in the board in the DB, the e-mail creation unit 150 creates an e-mail including the message. For example, when e-mail distribution information for a message registered in the board in the DB indicates that "an e-mail is to be distributed", the e-mail creation unit 150 reads an e-mail address of a member (user) in an organization registered in the board from the storage unit 160, and creates an e-mail addressed to the e-mail address. Note that a body text in the e-mail includes, for example, in addition to the message, a board ID of a board in which the message has been registered and a task ID of a task. The e-mail creation unit 150 outputs the created e-mail to the e-mail transmission unit 120.

The storage unit 160 includes a DB for storing, for each board, a task included in the board and a message included in the task. The storage unit 160 stores therein, for each board, an organization associated with the board and information (for example, ID, password, and e-mail address of member (user)) on a member of the organization.

Processing Procedure

Figure 3:
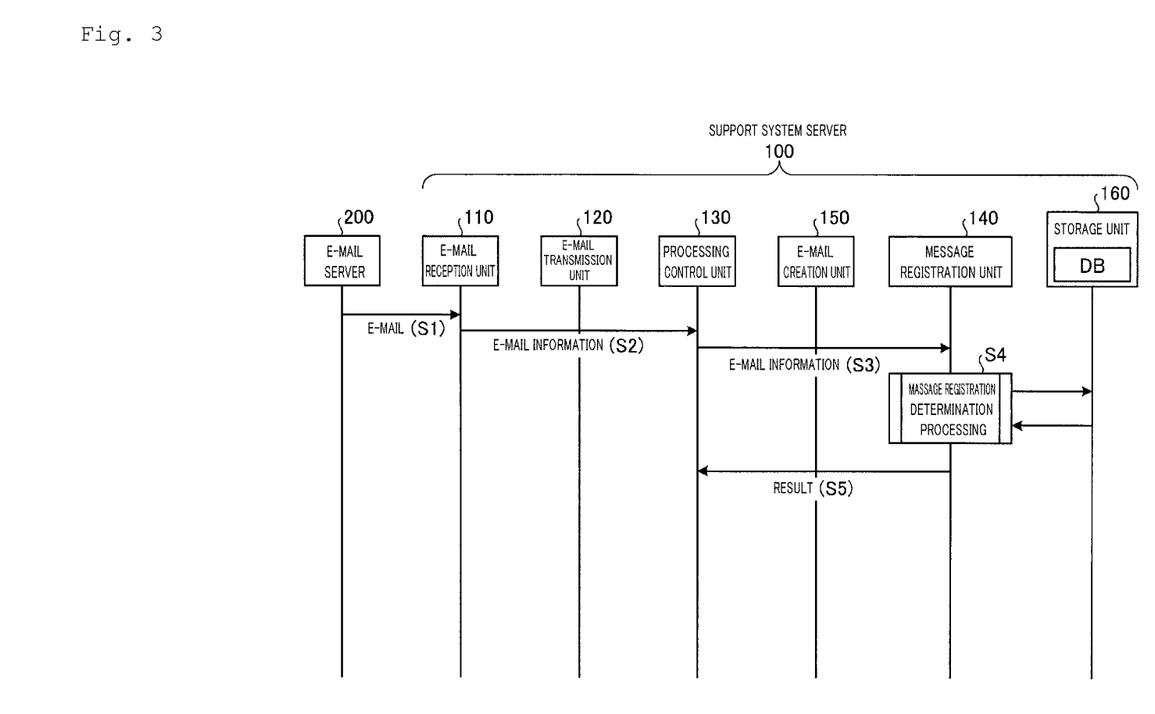
FIG. 3 is a flowchart illustrating an example of processing of the support system server.
Figure 4:
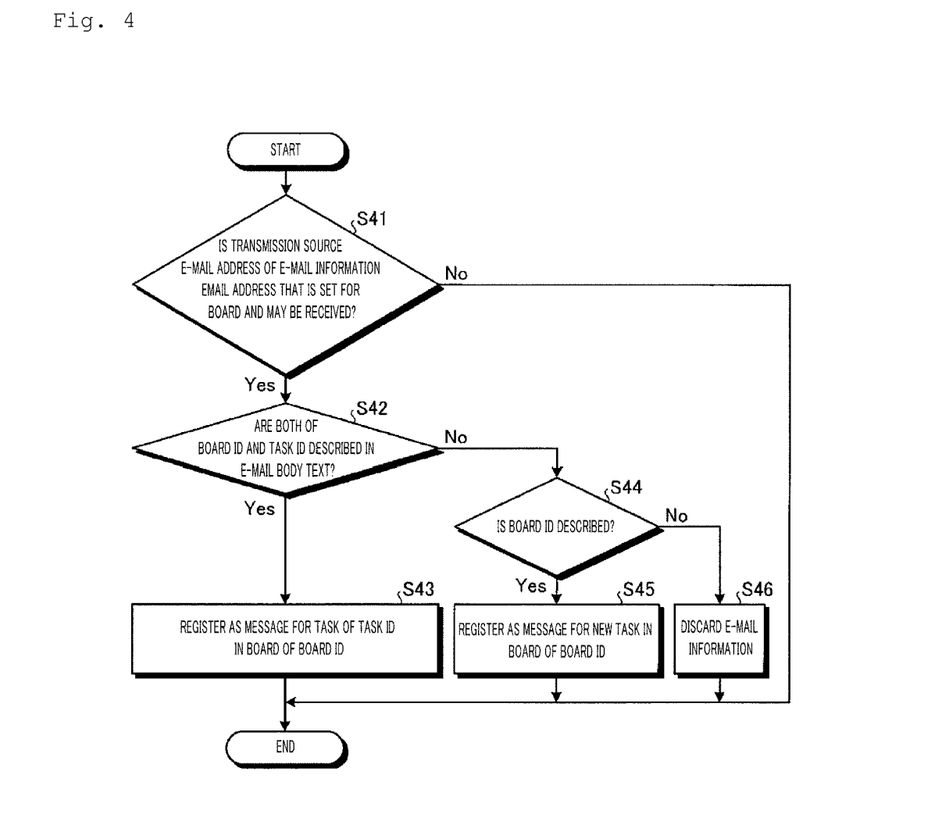
FIG. 4 is a flowchart illustrating an example of details of processing of S4 in FIG. 3.

Next, an example of a processing procedure of the support system server 100 is described with reference to FIG. 3 and FIG. 4. First, when the e-mail reception unit 110 in the support system server 100 receives an e-mail from the e-mail server 200 (S1), the e-mail reception unit 110 transfers e-mail information on the e-mail to the processing control unit 130 (S2). The processing control unit 130 transfers the e-mail information transferred at S2 to the message registration unit 140 (S3). After that, the message registration unit 140 performs message registration determination processing on the e-mail information transferred at S3 (S4), and returns a determination result to the processing control unit 130 (S5).

An example of the message registration determination processing (S4) is described with reference to FIG. 4. First, the message registration unit 140 determines whether a transmission source e-mail address of the e-mail information transferred at S3 in FIG. 3 is an e-mail address that is set for the board and may be received (S41).

For example, the message registration unit 140 determines, on the basis of a board ID included in the transferred e-mail information and information on a user of a board of the board ID in the storage unit 160, whether a transmission source address of the e-mail information is an e-mail address of the user of the board.

When the message registration unit 140 determines that the transmission source e-mail address of the e-mail information is an e-mail address that is set for the board and may be received (Yes at S41), the message registration unit 140 determines whether both of a board ID and a task ID are described in an e-mail body text of the e-mail information (S42). When the message registration unit 140 determines that both of the board ID and the task ID are described in the e-mail body text of the e-mail information (Yes at S42), a message included in the e-mail information is registered in the DB as a message for a task of the task ID in a board of the board ID (S43).

On the other hand, when the message registration unit 140 determines that the transmission source e-mail address of the e-mail information is not an e-mail address that is set for the board and may be received (No at S41), the processing is finished.

When the message registration unit 140 determines that a board ID is described but a task ID is not described in the e-mail body text of the e-mail information (No at S42→Yes at S44), the message registration unit 140 registers a message included in the e-mail information in a DB as a message for a new task in a board of the board ID (S45).

When the message registration unit 140 determines that neither of a board ID and a task ID is described in the e-mail body text of the e-mail information (No at S42→No at S44), the message registration unit 140 discards the e-mail information (S46). Note that, when the message registration unit 140 determines that neither of a board ID and a task ID is described in the e-mail body text of the e-mail information (No at S42→No at S44), the message registration unit 140 may register a message in the e-mail information as a message for a new task in a dedicated board. In this case, the message registration unit 140 may register the message in a dedicated board different depending on a transmission destination e-mail address. When a board ID or a task ID is not described in the e-mail body text, the message registration unit 140 may specify a board ID or a task ID by specifying an associated message from References of a header of the e-mail.

Note that although the illustration is omitted, the message registration unit 140 registers information indicating whether to distribute an e-mail, which is included in the e-mail information, in the DB together with the message. Information on an addresser of the e-mail s also registered in the DB, and displayed on the support system as "transmission source user of task". When attributes of the task such as priority are described in the e-mail body text, this information is also registered in the DB, and displayed on the support system as the attributes of the task such as "priority".

In this manner, the support system server 100 can register a message transmitted from a terminal of a user of a board by an e-mail as a task in the board.

Figure 5:
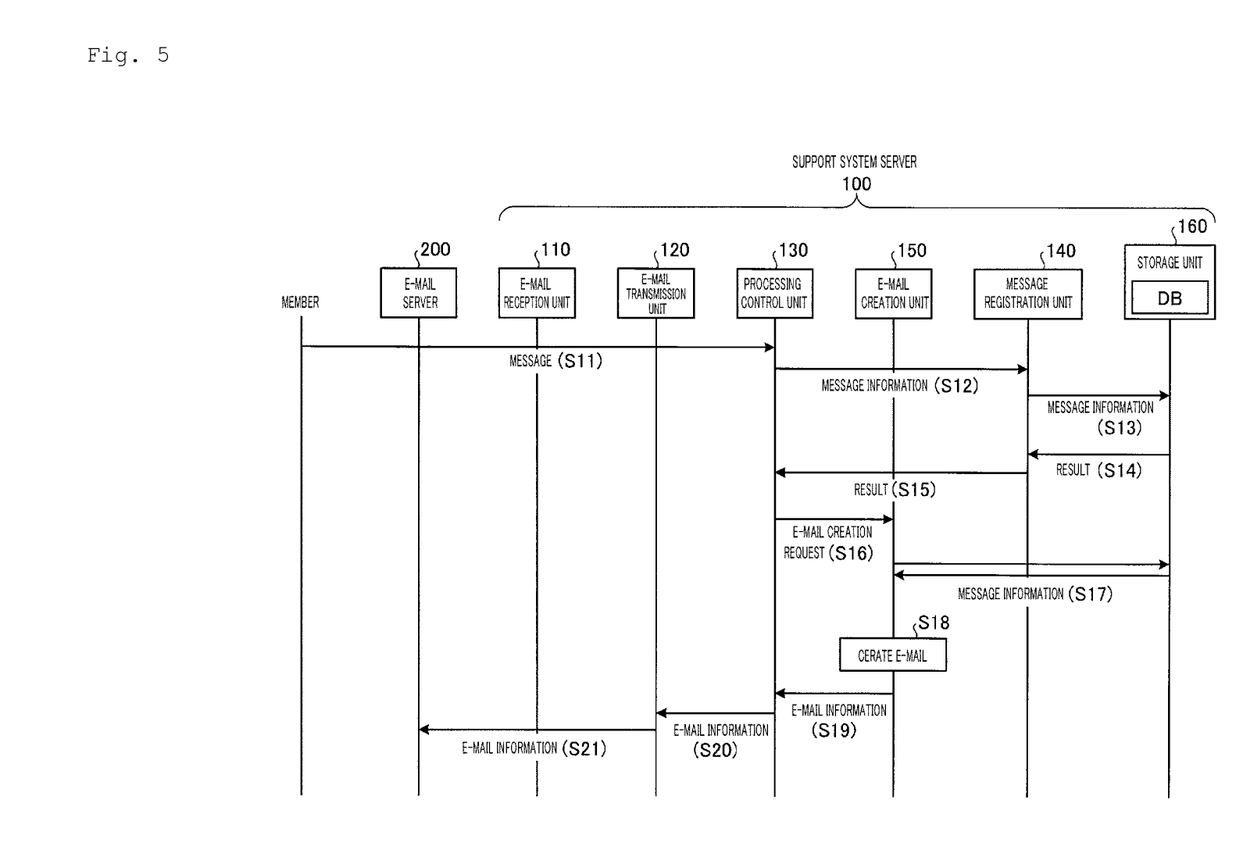
FIG. 5 is a flowchart illustrating an example of processing of the support system server.

Next, an example of a processing procedure when the support system server 100 receives a message to a board from a terminal of a user is described with reference to FIG. 5.

First, when the processing control unit 130 in the support system server 100 receives input of a message from a member (terminal of user) of a board (S11), the processing control unit 130 outputs information on the message (message information) to the message registration unit 140 (S12). The message registration unit 140 registers the message information in a DB in the storage unit 160 as a message to the board (S13). After that, when the message registration unit 140 receives a result of the registration of the message (S14), the message registration unit 140 outputs the registration result to the processing control unit 130 (S15).

After S15, the processing control unit 130 outputs an e-mail creation request based on the result of the registration of the message to the e-mail creation unit 150 (S16). For example, when the result of the registration of the message includes e-mail distribution information indicating that "an e-mail of the message is to be distributed", the processing control unit 130 outputs an e-mail creation request of which a destination is an e-mail address of a user of a board to which the message is to be registered to the e-mail creation unit 150. Note that when the registration result of the message does not include e-mail distribution information indicating that "an e-mail of the message is to be distributed", the e-mail creation request is not output to the e-mail creation unit 150.

After S16, the e-mail creation unit 150 acquires message information from the DB on the basis of the e-mail creation request received at S16 (S17), and creates an e-mail which includes the message information and whose destination is an e-mail address of a user of a board to which the message information is to be registered (S18). When the processing control unit 130 receives information on the e-mail (e-mail information) created by the e-mail creation unit 150 (S19), the processing control unit 130 outputs the e-mail information to the e-mail transmission unit 120 (S20). After that, the e-mail transmission unit 120 transmits the e-mail information to the e-mail server 200 (S21). Accordingly, the message registered in the board is distributed to a terminal of a user of the board by an e-mail.

In this manner, the support system server 100 can transmit a message registered in the board to a terminal of a member (user) of the board by an e-mail. As a result, even a user using a terminal that can use only an e-mail among users of the board can check a new message for the board.

Note that, in the above-mentioned example, the case where the support system server 100 receives a message to a board through a browser on a terminal of a user (member) of the board has been described, but the same processing is performed even when the message is transmitted by an e-mail.

In the above-mentioned embodiment, an e-mail address used by the support system server 100 to distribute an e-mail of a message to a member in an organization associated with a board may be an e-mail address of each member in the organization, or may be an e-mail address of a mailing list associated with the board.

When a message to be registered is a reply message for a message that has already been registered in a board, the message registration unit 140 may register the message to be registered in association with the message that has already been registered in the board (as thread). For example, when a message 2 transmitted by an e-mail is transmitted as a replay e-mail for a message 1 that has already been registered in a task 1 in a board, the message registration unit 140 registers the message 2 in association with the message 1 in the task 1. In this manner, the message registration unit 140 can register mutually relevant messages in the same task in a board in association with each other. As a result, a user of the board can easily check the mutually relevant messages.

This technology enables the support system server 100 to cooperate with an e-mail system, and enables a plurality of support system servers 100 to use e-mails and cooperate. By performing security measures of e-mails, such as encryption of attachment of e-mails and encryption of e-mails transmitted and received between a terminal of a user and the support system server 100 and use of transport layer security/secure sockets layer (TLS/SSL) on the e-mail server 200, the secret of communications can be secured in this technology.

[Program]

This technology can be implemented by installing a program for implementing the functions of the support system server 100 described in the above-mentioned embodiment onto a desired information processing device (computer). For example, by causing the information processing device to execute the above-mentioned program provided as packaged software or online software, the information processing device can function as the support system server 100. The information processing device as used herein includes a desktop or notebook personal computer and a rack-mounted server computer. In addition, the category of the information processing device includes a mobile communication terminal such as a smartphone, a mobile phone, and a personal handyphone system (PHS), and further a personal digital assistants (PDA). The support system server 100 may be implemented on a cloud server.

Figure 6:
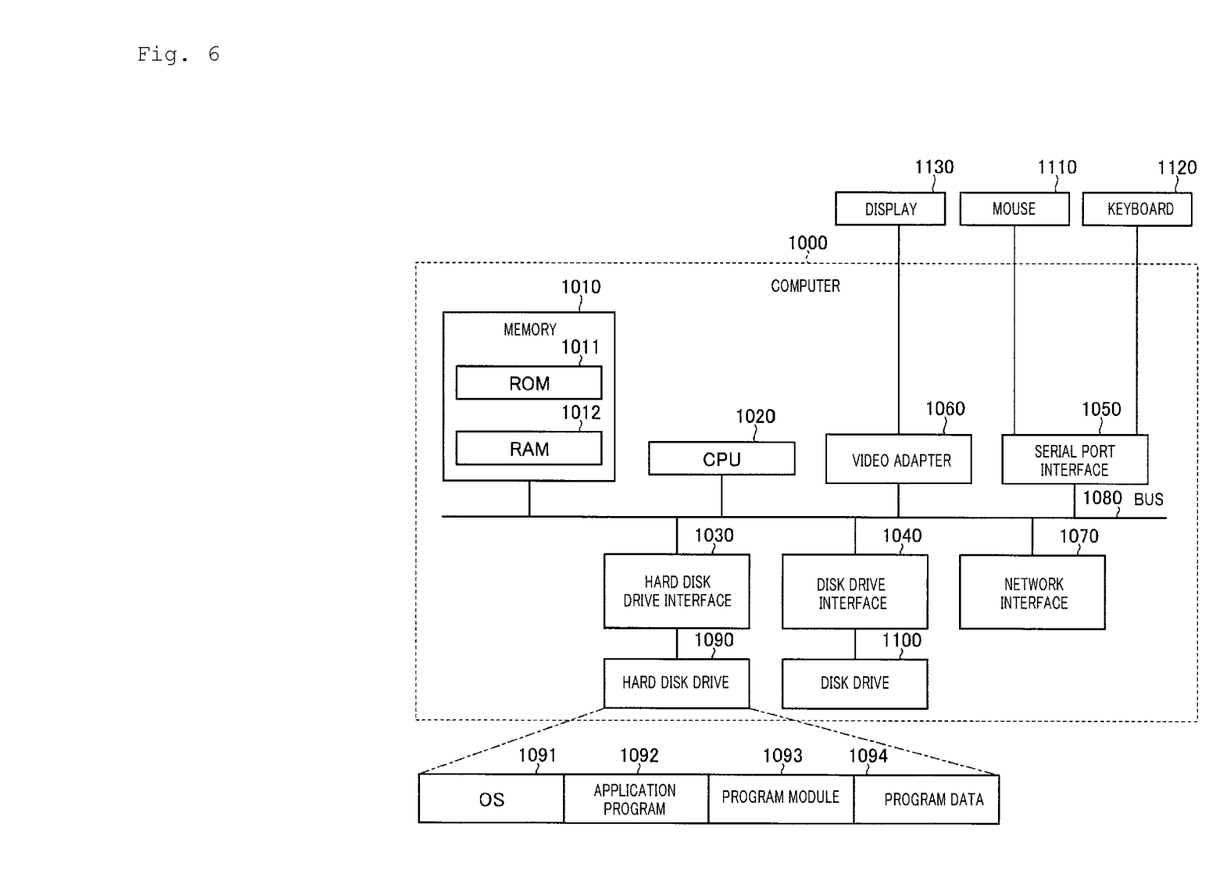
FIG. 6 is a block diagram illustrating as example of a computer for executing a support program.

An example of a computer for executing the above-mentioned program (management program) is described with reference to FIG. 6. As illustrated in FIG. 6, a computer 1000 includes a memory 1010, a CPU 1020, a hard disk drive interface 1030, a disk drive interface 1040, a serial port interface 1050, a video adapter 1060, and a network interface 1070. The units are connected by a bus 1080.

The memory 1010 includes a read only memory (ROM) 1011 and a random access memory (RAM) 1012. The ROM 1011 stores therein a boot program such as a basic input output system (BIOS). The hard disk drive interface 1030 is connected to a hard disk drive 1090. The disk drive interface 1040 is connected to a disk drive 1100. A removable storage medium such as a magnetic disk or an optical disc is inserted to the disk drive 1100. For example, the serial port interface 1050 is connected to a mouse 1110 and a keyboard 1120. For example, the video adapter 1060 is connected to a display 1130.

As illustrated in FIG. 6, for example, the hard disk drive 1090 stores therein an OS 1091, an application program 1092, a program module 1093, and program data 1094. The information stored in the DB described in the above-mentioned embodiment is stored in, for example, the hard disk drive 1090 and the memory 1010.

The CPU 1020 reads the program module 1093 and the program data 1094 stored in the hard disk drive 1090 onto the RAM 1012 as needed, and executes each of the above-mentioned procedures.

Note that the program module 1093 and the program data 1094 for the management program are not necessarily required to be stored in the hard disk drive 1090, and, for example, may be stored in a removable storage medium and read by the CPU 1020 through the disk drive 1100. Alternatively, the program module 1093 and the program data 1094 for the above-mentioned program may be stored in another computer connected through a network such as a LAN or a wide area network (WAN) and read by the CPU 1020 through the network interface 1070. The computer 1000 may execute processing by using a graphics processing unit (GPU) instead of the CPU 1020.

REFERENCE SIGNS LIST

100 Assist system server
110 E-mail reception unit
120 E-mail transmission unit
130 Processing control unit
140 Message registration unit
150 E-mail creation unit
160 Storage unit
200 E-mail server

The invention claimed is:

1. A management device for accepting, for each board related to crisis response activity, browsing of one or more messages registered in the board and registration of the messages to the board, comprising:
   a storage medium for storing, for each board, one or more messages registered in the board and e-mail address information on a user of the board;
   an e-mail reception unit, including one or more processors, for receiving an e-mail including a message to be registered on the board;
   a message registration unit, including one or more processors, for registering, when a transmission source of the received e-mail is an e-mail address indicated by e-mail address information on a user of the board, the message included in the e-mail into the board; and
   an e-mail distribution unit, including one or more processors, for distributing to a terminal used by the user that does not support a browser, when the message has been registered in the board, an e-mail including the registered message to an e-mail address of the user of the board.

2. The management device according to claim 1, wherein the board is configured to hold for each task related to crisis response activity, one or more messages related to the task in a classified manner, and the message registration unit is configured to register, when the message is a reply message for a message that has already been registered in the board, the reply message in a task to which the message belongs in association with the message.

3. The management device according to claim 1, wherein the board is configured to hold, for each task related to crisis response activity, one or more messages related to the task in a classified manner, and the message registration unit is configured to register, when a transmission source of the received e-mail is an e-mail address indicated by e-mail address information on a user of the board and when the received e-mail includes identification information on a task in the board, a message included in the e-mail as a message for the task in the board.

4. A management method to be executed by a management device for accepting, for each board related to crisis response activity, browsing of one or more messages registered in the board and registration of a message in the board, comprising:
   receiving an e-mail including a message to be registered on the board;
   referring to e-mail address information on a user of the board to determine whether a transmission source of the received e-mail is an e-mail address of the user of the board;
   registering, when the transmission source of the received e-mail is an e-mail address of the user of the board, the message included in the e-mail into the board; and
   distributing to a terminal used by the user that does not support a browser, when the message has been registered in the board, an e-mail including the registered message to the e-mail address of the user of the board.

5. A non-transitory computer readable medium storing one or more instructions for accepting, for each board related to crisis response activity, browsing of one or more messages registered in the board and registration of a message in the board, the non-transitory computer readable medium storing one or more instructions causing a computer to execute:
   receiving an e-mail including a message to be registered on the board;
   referring to e-mail address information on a user of the board to determine whether a transmission source of the received e-mail is an e-mail address of the user of the board;
   registering, when the transmission source of the received e-mail is an e-mail address of the user of the board, the message included in the e-mail into the board; and distributing to a terminal used by the user that does not support a browser, when the message has been registered in the board, an e-mail including the registered message to the e-mail address of the user of the board.

6. The management method according to claim 4, wherein the board is configured to hold for each task related to crisis response activity, one or more messages related to the task in a classified manner, and registering the message comprises registering, when the message is a reply message for a message that has already been registered in the board, the reply message in a task to which the message belongs in association with the message.

7. The management method according to claim 4, wherein the board is configured to hold, for each task related to crisis response activity, one or more messages related to the task in a classified manner, and registering the message comprises registering, when a transmission source of the received e-mail is an e-mail address indicated by e-mail address information on a user of the board and when the received e-mail includes identification information on a task in the board, a message included in the e-mail as a message for the task in the board.

8. The non-transitory computer readable medium according to claim 5, wherein the board is configured to hold for each task related to crisis response activity, one or more messages related to the task in a classified manner, and registering the message comprises registering, when the message is a reply message for a message that has already been registered in the board, the reply message in a task to which the message belongs in association with the message.

9. The non-transitory computer readable medium according to claim 5, wherein the board is configured to hold, for each task related to crisis response activity, one or more messages related to the task in a classified manner, and registering the message comprises registering, when a transmission source of the received e-mail is an e-mail address indicated by e-mail address information on a user of the board and when the received e-mail includes identification information on a task in the board, a message included in the e-mail as a message for the task in the board.

* * * * *